United States Patent [19]

Watkins

[11] 3,997,737
[45] Dec. 14, 1976

[54] SECURITY LINE CARD CIRCUIT

[75] Inventor: Arthur Gene Watkins, Santa Ana, Calif.

[73] Assignee: San/Bar Corporation, Santa Ana, Calif.

[22] Filed: Nov. 27, 1974

[21] Appl. No.: 527,513

[52] U.S. Cl. ............................ 179/99; 179/81 E
[51] Int. Cl.² ................................ H04M 1/68
[58] Field of Search ............ 179/81 E, 99, 78 A, 179/81 R, 84 R, 84 A

[56] References Cited
UNITED STATES PATENTS

| | | | |
|---|---|---|---|
| 2,975,237 | 3/1961 | Abbott | 179/99 |
| 3,126,452 | 3/1964 | Pettersson | 179/81 R |
| 3,372,236 | 3/1968 | Schwartz | 179/81 E |
| 3,614,334 | 10/1971 | Bonvallet | 179/81 R |
| 3,629,514 | 12/1971 | Flamini, Jr. | 179/99 |
| 3,703,611 | 11/1972 | Kiyomiya et al. | 179/99 |
| 3,715,514 | 2/1973 | Bell, Jr. | 179/81 E |
| 3,758,729 | 9/1973 | Everhart | 179/99 |

FOREIGN PATENTS OR APPLICATIONS 907,374  10/1962  United Kingdom ............ 179/81 E

*Primary Examiner*—Kathleen H. Claffy
*Assistant Examiner*—Randall P. Myers
*Attorney, Agent, or Firm*—Jackson & Jones Law Corp.

[57] ABSTRACT

To prevent clandestine listening devices located in a key telephone subscriber station from utilizing the tip and ring leads of the subscriber station as a transmission path out of the subscriber's building, the subscriber station tip and ring leads are open circuited at the line card circuit during an on-hook or hold condition. Besides isolating the tip and ring leads from the subscriber station during hold and on-hook, the security line card circuit prevents high frequency signals from propagating down the telephone line when the subscriber station is on-hook. The security line card circuit allows the subscriber to exercise full supervisory control over the telephone lines and includes circuitry that controls the operation of audible and visual indicators of the associated key telephone.

28 Claims, 1 Drawing Figure

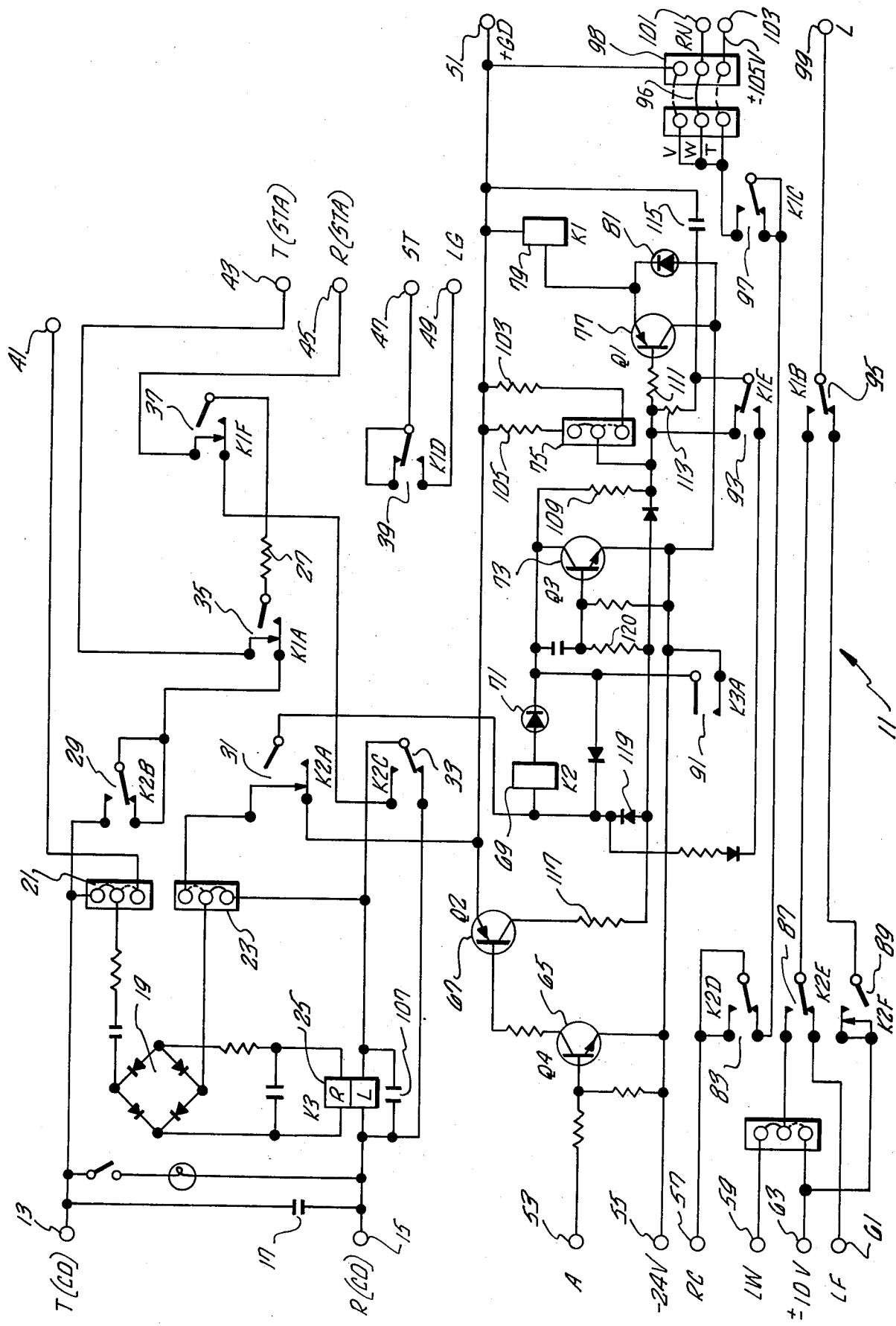

SECURITY LINE CARD CIRCUIT

BACKGROUND OF THE INVENTION

The present invention relates to line card circuits and more particularly pertains to improved key telephone unit (KTU) line card circuits that prevent a clandestine listening device implanted in a subscriber station from utilizing the telephone line as a transmission path out of the subscriber's building.

A typical key telephone unit is generally used to permit a subscriber to have several different telephone lines, each line having a different number available for use with a single subscriber station. Such key telephones are recognizable by the usual line buttons thereon that may be individually operated by the user to select the telephone line to be used from among the several different lines connected to the subscriber station. For example, a particular telephone line would be selected and used by depressing the corresponding button at the subscriber station and placing the subscriber station in an off-hook condition.

As is well known, line card circuits are generally used in key telephone systems to control the operating condition of a telephone line and to control the operation of the audible and visual signaling devices at the subscriber station. A single line card circuit is installed at the location of the subscriber station for each different telephone line serving the subscriber station.

A telephone line is generally capable of being in one of three operating conditions. These conditions are the ringing condition, the seized condition and the hold condition. The ringing condition will exist during periods in which ringing current is being supplied to the subscriber station in response to a ringing indication from the central office. An audible signaling device, such as a ringer or buzzer, or the like located at the subscriber station being called will respond to such ringing current and provide an audible indication that an incoming call is being received. A light position beneath or in close proximity to the line button corresponding to the line on which the incoming call is being received will be illuminated to identify the telephone line at the subscriber station receiving the call. Such line button light will also be illuminated to identify the telephone line being used for an outgoing call.

A seized line exists during periods in which parties to a telephone conversation have their respective subscriber stations operated to permit the conversation to be carried on. A hold condition is generally used by a subscriber when it is desired to interrupt a conversation without releasing the telephone line being used. For example, a subscriber in the middle of a conversation on a first line may desire to answer an incoming call on a different line. The first line would be placed in a hold condition by operating a hold button at the subscriber station. The subscriber could then answer the incoming call without dropping the first line. Conversation on the held telephone line can later be resumed by simply operating (usually by depressing) the coresponding line button. Obviously, the hold condition permits several telephone lines to be served at once from a single subscriber station.

The tip and ring lines of each telephone line terminating at the subscriber station provide a convenient transmission path out of the subscriber's building for any clandestine listening device placed within the subscriber station for the purpose of overhearing conversations conducted in the room within which the subscriber station is located. Utilization of these types of listening devices would be discouraged if the telephone line were not such a convenient transmission path of the building in which the subscriber station is located.

OBJECTS AND SUMMARY OF THE INVENTION

The object of this invention is to provide a line card circuit for use with a subscriber station that prevents a clandestine listening device from using the telephone line as a transmission path out of a subscriber's building.

This object and the general purpose of this invention is accomplished by providing a line card that utilizes a plurality of contacts in the tip and ring circuit of the line card to isolate the central office tip and ring lines from the subscriber station tip and ring lines during on-hook and hold states of the telephone line. During off-hook, high frequency signals are prevented from propogating past the line card circuit. Ringing signals and visual line indications are provided by local apparatus in response to ringing current and talking current from the central office.

BRIEF DESCRIPTION OF THE DRAWINGS

Other objects and many of the attendant advantages of this invention will be readily appreciated as the invention becomes better understood by reference to the following detailed description when considered in conjunction with the accompanying drawing in which like reference numerals designate like parts throughout the figure thereof and wherein:

The FIGURE is a detailed schematic diagram of a line card circuit according to the present invention.

DESCRIPTION OF THE PREFERRED EMBODIMENTS

A line card circuit 11 is inserted in a telephone line between a key telephone subscriber station and a central office, generally at the subscriber station location for each telephone line terminating at the subscriber station. Tip T(CO) and ring R(CO) lines from the central office are connected to terminals 13 and 15 respectively of the line card circuit 11. Tip T(STA) and ring R(STA) lines for a telephone line from the subscriber station are connected to terminals 43 and 45 respectively of the line card circuit 11. Other connections to the line card circuit 11 will be explained subsequently, in connection with and during the explanation of the operation of the line card circuit 11.

Assume first, that the particular telephone line with which the line card circuit 11 is associated is in an on-hook state. The various contact switches 29, 31, 33, 35, 37, 39, 97, 93, 95, 83, 87, 89 and 91 in the line card circuit 11 are in their neutral or unactuated state, as shown in the drawing. In this state, it can be seen that contacts 29 disconnect the tip ring terminal 43 for the subscriber station from the tip ring terminal 13 for the central office. Contacts 33 disconnect the ring terminal 45 for the subscriber station from the ring terminal 15 for the central office. The neutral position of contacts 33, as shown causes relay coil L of K3 relay 25 to be short circuited. During the on-hook condition, therefore, contacts 29 and 33 isolate the subscriber station tip and ring lines from the central office tip and ring lines at the location of the line card circuit 11. Any clandestine listening device located at the subscriber station that is hooked into the tip and ring lines of the subscriber station will thus be prevented from sending information further than the line card circuit 11 during the on-hook state of the subscriber station.

This neutral or on-hook condition can be interrupted either by ringing current being received at the tip and ring terminals 13, 15 from a central office, or the subscriber station going off-hook, thereby causing loop current to be present in the tip and ring circuit of the line card circuit 11.

Assume now that ringing current is received from the central office at terminals 13, 15. Ringing current, as is well known, is AC current bursts of 2 seconds spaced 4 seconds apart. This AC current is detected by a full wave diode rectifier 19 causing a DC potential to be applied across the ring coil R of K3 relay 25. Either loop coil L or ring coil R of relay 25 activates K3A contact 91. With ringing current being received at central office tip and ring terminals 13, 15, K3A relay contacts 91 are closed by ring coil R, causing a −24 volts at terminal 55 to be connected into the base circuit of Q1 transistor 77. This causes a current flow through resistor 111, connected to the base of Q1 transistor 77, through resistor 109, through contacts 91 to the terminal 55. This forward biases the Q1 transistor 77 causing it to turn on.

When Q1 transistor 77 is conducting a current flows through K1 relay 79 from the plus ground terminal 51 through K1 relay 79, through Q1 transistor 77 to the minus voltage terminal 55. With the K3A contacts 91 closed, a capacitor 115 in series with a resistor 113 is charged by a current flow from the plus ground terminal 51, through the resistor 109, through the K3A contacts 91, to the minus voltage terminal 55. The capacitor 115 provides a biasing potential to the base of Q1 transistor 77 during the periods when a ringing current burst is not being received at the central office tip and ring terminals 13, 15 and K3A contacts 91 are opened as a consequence thereof. The RC constant of the circuit consisting of capacitor 115 and resistors 113 and 105, 103 are sufficient to keep the proper forward bias at the base of Q1 transistor 77 for the four second intervals between ringing current bursts.

With the K1 relay 79 actuated, the contacts associated with the K1 relay change position as a result thereof. Thus, K1A contacts 35, K1F contacts 37, K1D contacts 39, K1C contacts 97, K1E contacts 93, and K1B contacts 95 are all switched to their alternate positions.

With K1D contacts 39 in the alternate position, an interrupter circuit (not shown) connected to terminals 47, 49 is enabled. Such an interrupter is well known and consequently will not be described in detail herein. Briefly, however, the conventional interrupter may include a motor which drives a series of cams that periodically operate a number of mechanical switches to produce desired line lamp operation and audible signaling at a key telephone. In other words, when the closing of K1D contact 39 causes the interrupter circuit to be enabled, the interrupter circuit, in turn, will pass ringing current through one of its contact closures to terminal 101.

The interrupter will pass a 10 VAC current through some other of its contact closures in the following manner. A cam closes one contact pair for 0.75 seconds, then opens them for 0.25 seconds to supply "lamp winking"(LW) current to terminal 59. Another cam closes its contact pair for 0.5 seconds, then opens them for 0.5 seconds to supply "lamp flashing" (LF) current to terminal 61. A continuous 10 VAC signal is supplied to terminal 63 and does not pass through any interrupter contacts. Similarly, a continuous 105 VAC signal is supplied to terminal 103 without passing through any interrupter contacts. A strap option block 98 allows the selection of one of three ringing signals. With the link 96 in position V, a ground will be supplied to terminal 57 when only the K1 relay 79 is actuated. With the link 96 in position W, interrupted ringing current will be supplied. With link 96 in position T, continuous ringing current will be supplied. With incoming ringing current present at the central office, tip and ring leads 13, 15, K1C contacts 97 supply ringing current to terminal 57. An audible signaling device, such as a ringer or buzzer physically located near the key telephones being served, connects between terminal 57 and the common return line of the ringing current generator.

By enabling the interrupter, line lamp control signals are provided through terminals 59, 61 and 63. With incoming ringing current present at the central office tip and ring leads 13, 15, K1B contacts 95 connect a line lamp (not shown) attached to terminal 99 to the lamp flashing control terminal 61 through K2E contacts 87. The local interrupter circuit (not shown) connected to terminals 47, 49, in response to the alternate positioning of K1D contacts 39 supplies ringing current to the audible signaling device (not shown) at the subscriber station as well as causing the line lamp under the line button for the appropriate telephone line to flash at the previously defined 50% duty cycle rate.

Assume now that the subscriber station is switched to an off-hook state by the subscriber. This is accomplished by pressing the appropriate line button, that is the line button exhibiting the flashing, and removing the receiver-transmitter hand set from its cradle. As a result of this action, a ground potential is supplied to the A lead connected to terminal 53. This terminal 53 is grounded only during the off-hook or seized line conditions and is left open circuited during the ringing and hold states. In an off-hook state, line current is supplied to the tip and ring circuit from the central office.

At the same time, the ground potential applied to terminal 53 causes Q2 transistor 67 and Q4 transistor 65 to turn on. With Q2 transistor 67 conducting, an effective ground potential is placed on the base of Q1 transistor 77, via terminal 51, through Q2 transistor 67 and resistor 117 thereby turning it off and de-energizing K1 relay 79. All the contacts 35, 37, 39, 97, 93 and 95 associated with this relay return to their neutral positions. As a consequence, ringing at the subscriber station ceases and, as will be more clearly seen later, the lamp at the line button will stop flashing and maintain a steady illumination.

With Q2 transistor 67 conducting, current will flow from the ground terminal 51 through Q2 transistor 67, through resistor 117, through resistor 120, to the base of Q3 transistor 73. Q3 transistor 73, as a consequence, turns on to allow current flow through Q2 transistor 67, through resistor 117, through diode 119, through the coil winding of K2 relay 69, through LED 71, and through the now conducting Q3 transistor 73 to terminal 55. This causes K2 relay 69 to actuate and switch all the contacts associated with it. Thus, K2B contacts 29, K2A contacts 31, K2C contacts 33, K2D contacts 83, K2E contacts 87 and K2F contacts 89 are switched to their alternate position. This action removes the short across the K3L coil 25 caused by K2C contacts 33. The DC line current flowing through the tip and ring circuit from the central office is now allowed to flow through the K3L coil 25 as well. K3 relay 25 is, therefore, actuated and K3A contacts 91 subsequently close. K3A contacts 91 will remain closed so long as line current continues to flow through the K3L coil 25. The switching of K2F contacts 89 causes a steady 10 volts to be placed at the lamp terminal 99 causing the lamp (not shown) to maintain a steady illumination.

The actuation of K2B contact 29 connects the central office tip lead terminal 13 to the subscriber station tip lead terminal 43. Actuation of K2C contacts 33 causes the central office lead terminal 15 to be connected to the subscriber station ring lead terminal 45. This completes the talking circuit. Once K2 relay 69 is actuated closing K2A contacts 31, thereby placing one side of the K2 relay 69 at ground potential, the K2 relay 69 will remain actuated even through the Q2 transistor 61 stops conducting.

During this off-hook condition in which a tip and ring line is seized, a clandestine listening device utilizing a high frequency carrier could transmit its information from the subscriber set out of the subscriber's building over the tip and ring lines. A capacitor 17 is placed across the tip and ring lines having a value that will short circuit high frequency signals without affecting the audio frequency signals, to prevent this from occurring. Thus, even though the tip and ring circuit is closed for audio frequency signals it is an effective short circuit for the higher frequency signals at which clandestine listening devices usually operate.

Assuming now that the subscriber at the subscriber station wishes to place the telephone line in a hold condition, a hold button (not shown) on the subscriber station would be depressed causing removal of the ground at the A lead terminal 53. Removal of this ground causes Q2 transitor 67 and Q4 transistor 65 to stop conducting. With Q2 transistor 67 turned off and the K3A contacts 91 still closed because the subscriber station is still off-hook, Q1 transistor 77 turns on thereby energizing K1 relay 79. This in turn, switches all the contacts associated with K1 relay 79. Thus K1A contacts 35, K1F contacts 37, K1D contacts 39, K1C contacts 97, K1E contacts 93, and K1B contacts 95 are switched to their alternate positions. With K1A contacts 35 and K1F contacts 37 switched to their alternate positions it can be seen that a resistor 27 is connected across the central office tip and ring terminals 13, 15 because the K2B contacts 29 and K2C contacts 33 are still held in their alternate position by K2 relay 69. The circuit can be traced from T(CO) terminal 13 through K2B contacts 29, through K1A contacts 35 through the hold resistor 27, through K1F contacts 37, through K2C contacts 33 to R(CO) terminal 15. With K1A contacts 35 and K1F contacts 37 actuated in this manner, the T(STA) terminal 43 and R(STA) terminal 45 of the subscriber station are respectively isolated from the central office tip and ring terminals.

This isolation is the result of the contact set-up utilized for contacts 35 and 37. In the unswitched state, contacts 35 connect the T(STA) terminal 43 to the K2B contacts 29 and contacts 37 connect the R(STA) terminals 45 to the K2C contacts 33. However, when the K1A and K1F contacts 35 and 37 are switched, these tip and ring terminals are disconnected.

The lamp connected to lamp terminal 99, as a consequence of the hold condition begins to wink. This occurs because the K1B contacts 95 are switched to connect the lamp terminal 99 to the lamp hold flashing terminal 59 through K2E contacts 87. K2D contact 83 is switched so that ringing current cannot be supplied to the audible signal device (not shown) in the subscriber station.

The telephone line is removed from the hold state by redepressing the winking line button (not shown) for the held telephone line. This replaces the ground at A terminal 53 causing Q2 transistor 67 and Q4 transistor 65 to turn-on. With Q2 transistor 67 conducting an effective ground potential is placed at the base of Q1 transistor 77, causing it to turn-off, thereby de-energizing K1 relay 79 and allowing all the contacts associated with K1 relay 79 to return to their neutral positions. This removes the holding resistor 27 from across the central office tip and ring terminals 13, 15 respectively.

If the other party abandons the call while the telephone line is in the hold condition, the L coil of K3 relay 25 will become de-energized since the flow of loop current will cease. This causes K3A contact 91 to open, thereby turning off Q1 transistor 77 de-energizing K1 relay 79 and deenergizing K2 relay 69, allowing all contacts to return to their neutral positions.

When a party at the subscriber station wishes to place an outgoing call, he depresses the appropriate telephone line button and places the subscriber station in an off-hook condition. This action will cause a ground potential to be placed at A lead terminal 53, thereby turning on Q2 transistor 67 and Q4 transistor 65. With Q2 transistor 67 conducting, Q3 transistor 73 is turned on, thereby providing a current path through K2 relay 69 from the ground terminal 51 to the minus voltage terminal 55. This path may be traced from ground terminal 51 through Q2 transistor 67, through resistor 117, through diode 119, through K2 relay 69, through diode 71, through Q3 transistor 73, to minus voltage terminal 55.

This causes the K2 relay 69 to be energized, thereby switching K2B contacts 29 and K2C contacts 33 connecting the subscriber station tip and ring terminals 43, 45 respectively to the central office tip and ring terminals 13, 15 respectively. As K2C contacts 33 is switched, the short circuit of the coil L of K3 relay 25 is removed, thereby energizing the L coil and switching K3A contacts 91. Since Q2 transistor 67 is conducting however, Q1 transistor 77 will remain off.

The call may be terminated at the subscriber station by causing it to go into an on-hook state. This stops loop current from flowing through the L coil of K3 relay 25, thereby opening K3A contacts 91. The on-hook condition additionally removes the ground potential from the A terminal 53 thereby turning off Q2 transistor 67, Q4 transistor 65 and Q3 transistor 73. This breaks the circuit path for K2 relay 69 causing it to de-energize and allow the contacts associated with it to return to their normal state.

From the above description, it can be seen that a line card circuit is provided that prevents clandestine listening devices placed at the subscriber station from utilizing the tip and ring leads of a telephone line as the transmission path out of the subscriber building. Obviously, modifications and variations of the present invention are possible in light of the above teachings. It is, therefore, to be understood that, within the scope of the appended claims, the invention may be practiced otherwise than as specifically described.

What is claimed is:

1. In a line card circuit inserted in the tip and ring lines between a central office and a subscriber station for providing supervisory control over said tip and ring lines and the operation of visual and audible indicators at the subscriber station, apparatus for isolating the central office tip and ring lines from the subscriber station tip and ring lines during on-hook and hold conditions at the subscriber station, comprising:
   first means for connecting the subscriber station tip line to the central office tip line, upon actuation;
   second means for connecting the subscriber station ring line to the central office ring line, upon actuation;
   third means, normally in a closed state, for disconnecting the subscriber station tip line from the central office tip line, upon being actuated to an open state;
   fourth means, normally in a closed state, for disconnecting the subscriber station ring line from the central office ring line, upon being actuated to an open state;
   first actuation means for actuating said first and second means in response to an off-hook condition at the subscriber station; and
   second actuation means for actuating said third and fourth means to an open state in response to a hold condition at the subscriber station.

2. The isolating apparatus of claim 1, further comprising: a ring current detector means connected to said central office tip and ring lines for detecting ring current from the central office.

3. The isolating apparatus of claim 2 wherein said second actuation means is also responsive to said ring current detector means.

4. The isolating apparatus of claim 3, further comprising: means for enabling a local ringing current generating means, said enabling means being responsive to said second actuation means.

5. The isolating apparatus of claim 1, further comprising: an impedance means connected to said third and fourth disconnect means, said third and fourth disconnect means connecting said impedance means to said central office tip line and said central office ring line, upon actuation.

6. The isolating apparatus of claim 5, further comprising: a ring current detector means connected to said central office tip and ring lines for detecting ring current from the central office.

7. The isolating apparatus of claim 6, further comprising: means for enabling a local ringing current generating means, said enabling means being responsive to said second actuation means.

8. A line card circuit for insertion in the tip and ring lines between a central office and a key telephone subscriber station to provide supervisory control over said tip and ring lines and the operation of visual and audible indicators at the subscriber station, and isolate the central office tip and ring lines from the subscriber station tip and ring lines, during on-hook and hold conditions at the subscriber station, comprising:
   first means, normally in an open state, for connecting, upon actuation, the subscriber station tip line to the central office tip line;
   second means, normally in an open state, for connecting, upon actuation, the subscriber station ring line to the central office ring line;
   first means, normally in a closed state, for disconnecting, upon actuation, the subscriber station tip line from the central office tip line;
   second means, normally in a closed state, for disconnecting, upon actuation, the subscriber station ring line from the central office ring line;
   first means for actuating said first and second connecting means in response to an off-hook condition at the subscriber station; and
   second means for actuating said first and second disconnect means in response to a hold condition at the subscriber station.

9. The line card circuit of claim 8, further comprising: a ring current detector means connected to said central office tip and ring lines for detecting ring current from the central office.

10. The line card circuit of claim 9, wherein said second actuation means is also responsive to said ring current detector means.

11. The line card circuit of claim 10, further comprising; means for enabling a local ringing current generating means, said enabling means being responsive to said second actuation means.

12. The line card circuit of claim 10, further comprising: means for enabling a local visual indication source, said enabling means being responsive to said second actuating means or said first actuating means.

13. The line card circuit of claim 8, further comprising: an impedance means connected to said first and second disconnect means, said first and second disconnect means connecting said impedance means to said central office tip line and said central office ring line, upon actuation.

14. The line card circuit of claim 13, further comprising: a ring current detector means connected to said central office tip and ring lines for detecting ring current from the central office.

15. The line card circuit of claim 14, wherein said second actuating means is also responsive to said ring current detector means.

16. The line card circuit of claim 15, further comprising: means for enabling a local ringing current generating means, said enabling means being responsive to said second actuating means.

17. The line card circuit of claim 15, further comprising: means for enabling a local visual indication source, said enabling means being responsive to said second actuating means or said first actuating means.

18. In a line card circuit inserted in the tip and ring lines between a central office and a subscriber station for providing supervisory control over said tip and ring lines and the operation of visual and audible indicators at the subscriber station, apparatus for preventing a clandestine listening device planted in said subscriber station from utilizing said tip and ring lines as a transmission path, said apparatus comprising:
   first means, normally in an open state, for connecting, upon actuation, the subscriber station tip line to the central office tip line;
   second means, normally in an open state, for connecting, upon actuation, the subscriber station ring line to the central office ring line;
   first means, normally in a closed state, for disconnecting, upon actuation, the subscriber station tip line from the central office tip line;
   second means, normally in a closed state, for disconnecting, upon actuation, the subscriber station ring line from the central office ring line;

first means for actuating said first and second connecting means in response to an off-hook condition at the subscriber station;

means in said subscriber station tip and ring loop for short circuiting high frequency signals from a clandestine listening device without affecting the transmission of audio frequency signals; and second means for actuating said first and second disconnect means in response to a hold condition at the subscriber station.

19. The apparatus of claim 18, wherein said high frequency signal short circuiting means comprises:
a capacitor connected across the central office side of said tip and ring leads.

20. The line card circuit of claim 18, further comprising: a ring current detector means connected to said central office tip and ring lines for detecting ring current from the central office.

21. The line card circuit of claim 20, wherein said second actuation means is also responsive to said ring current detector means.

22. The line card circuit of claim 21, further comprising: means for enabling a local ringing current generating means, said enabling means being responsive to said second actuation means.

23. The line card circuit of claim 21, further comprising; means for enabling a local visual indication source, said enabling means being responsive to said second actuating means or said first actuating means.

24. The line card circuit of claim 18, further comprising: an impedance means connected to said first and second disconnect means, said first and second disconnect means connecting said impedance means to said central office tip line and said central office ring line, upon actuation.

25. The line card circuit of claim 24, further comprising a ring current detector means connected to said central office tip and ring lines for detecting ring current from the central office.

26. The line card circuit of claim 25, wherein said second actuating means is also responsive to said ring current detector means.

27. The line card circuit of claim 26, further comprising: means for enabling a local ringing current generating means, said enabling means being responsive to said second actuating means.

28. The line card circuit of claim 26, further comprising; means for enabling a local visual indication source, said enabling means being responsive to said second actuating means or said first actuating means.

* * * * *